United States Patent
Battle-Miller et al.

(10) Patent No.: US 12,531,061 B2
(45) Date of Patent: Jan. 20, 2026

(54) METHODS AND SYSTEMS FOR ENHANCED CONFERENCING

(71) Applicant: Comcast Cable Communications, LLC, Philadelphia, PA (US)

(72) Inventors: Maria Battle-Miller, Philadelphia, PA (US); Christopher Day, Philadelphia, PA (US); Rima Shah, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 208 days.

(21) Appl. No.: 18/194,924

(22) Filed: Apr. 3, 2023

(65) Prior Publication Data
US 2024/0331690 A1    Oct. 3, 2024

(51) Int. Cl.
*G10L 15/22* (2006.01)
*G10L 15/01* (2013.01)
*G10L 15/05* (2013.01)
*G10L 15/26* (2006.01)
*G10L 25/78* (2013.01)

(52) U.S. Cl.
CPC .............. *G10L 15/22* (2013.01); *G10L 15/01* (2013.01); *G10L 15/05* (2013.01); *G10L 15/26* (2013.01); *G10L 25/78* (2013.01)

(58) Field of Classification Search
CPC ......... G10L 15/22; G10L 15/26; G10L 15/01; G10L 15/05; G10L 25/78; G10L 25/87; G10L 15/07; G10L 15/04; G10L 25/30; G06F 40/279; G06F 40/35; G06F 40/30; H04M 2201/40; H04M 3/568
USPC ............................ 704/9, 235, 270, 275, 246
See application file for complete search history.

(56) References Cited

U.S. PATENT DOCUMENTS

| | | | | |
|---|---|---|---|---|
| 7,822,050 B2 * | 10/2010 | DeGrazia | .......... | H04M 3/42391 704/207 |
| 8,411,835 B2 * | 4/2013 | Gorti | .................. | H04L 65/4038 379/202.01 |
| 8,750,678 B2 * | 6/2014 | Li | ......................... | H04N 7/155 386/248 |
| 9,686,275 B2 * | 6/2017 | Chari | .................. | H04L 63/0861 |
| 9,881,615 B2 * | 1/2018 | Choi | ..................... | G10L 15/183 |
| 10,074,361 B2 * | 9/2018 | Song | ....................... | G10L 15/16 |
| 10,552,118 B2 * | 2/2020 | Abuelsaad | ............ | H04M 3/569 |
| 11,115,541 B2 * | 9/2021 | Dickins | ............... | G10L 21/0232 |
| 11,417,330 B2 * | 8/2022 | Reece | ..................... | G06F 18/25 |
| 11,810,357 B2 * | 11/2023 | Reece | ................... | G06F 40/284 |
| 11,978,457 B2 * | 5/2024 | Medalion | ................ | H04N 7/15 |
| 2003/0231746 A1 | 12/2003 | Hunter | ................... | H04M 3/56 379/202.01 |
| 2006/0062366 A1 * | 3/2006 | Tiruthani | ................ | H04M 3/56 379/215.01 |
| 2008/0101575 A1 * | 5/2008 | Amador | .................. | H04M 3/56 379/202.01 |
| 2008/0137558 A1 * | 6/2008 | Baird | ..................... | H04L 65/403 370/260 |
| 2009/0060157 A1 * | 3/2009 | Kim | ................... | H04M 3/42187 379/202.01 |

(Continued)

*Primary Examiner* — Vijay B Chawan
(74) *Attorney, Agent, or Firm* — Ballard Spahr LLP

(57) ABSTRACT

Methods, systems, and apparatus are described herein for enhanced conferencing. A computing device monitor user participation. One or more conference features may be activated or deactivated based on speech patterns of conference participants.

21 Claims, 9 Drawing Sheets

"Lets move forwa..."

"hooray!"

→ "Lets move forwahooray!"

(56) References Cited

U.S. PATENT DOCUMENTS

| | | | |
|---|---|---|---|
| 2009/0168984 A1* | 7/2009 | Kreiner | G06F 3/165 379/202.01 |
| 2011/0112833 A1* | 5/2011 | Frankel | G06F 16/685 704/235 |
| 2015/0264316 A1* | 9/2015 | Sanaullah | H04N 7/15 348/14.07 |
| 2017/0076713 A1* | 3/2017 | Gildein, II | H04N 7/15 |
| 2018/0191912 A1* | 7/2018 | Cartwright | H04L 65/403 |
| 2020/0092422 A1* | 3/2020 | Dickins | H04M 3/42221 |
| 2020/0145536 A1* | 5/2020 | Deluca | H04M 3/568 |
| 2020/0411038 A1* | 12/2020 | Reynolds | H04M 3/569 |
| 2022/0115019 A1* | 4/2022 | Bradley | G10L 15/063 |
| 2022/0189489 A1* | 6/2022 | Peeler | G10L 17/04 |
| 2022/0321622 A1* | 10/2022 | Kuo | G10L 15/26 |
| 2024/0331690 A1* | 10/2024 | Battle-Miller | H04M 3/568 |

* cited by examiner

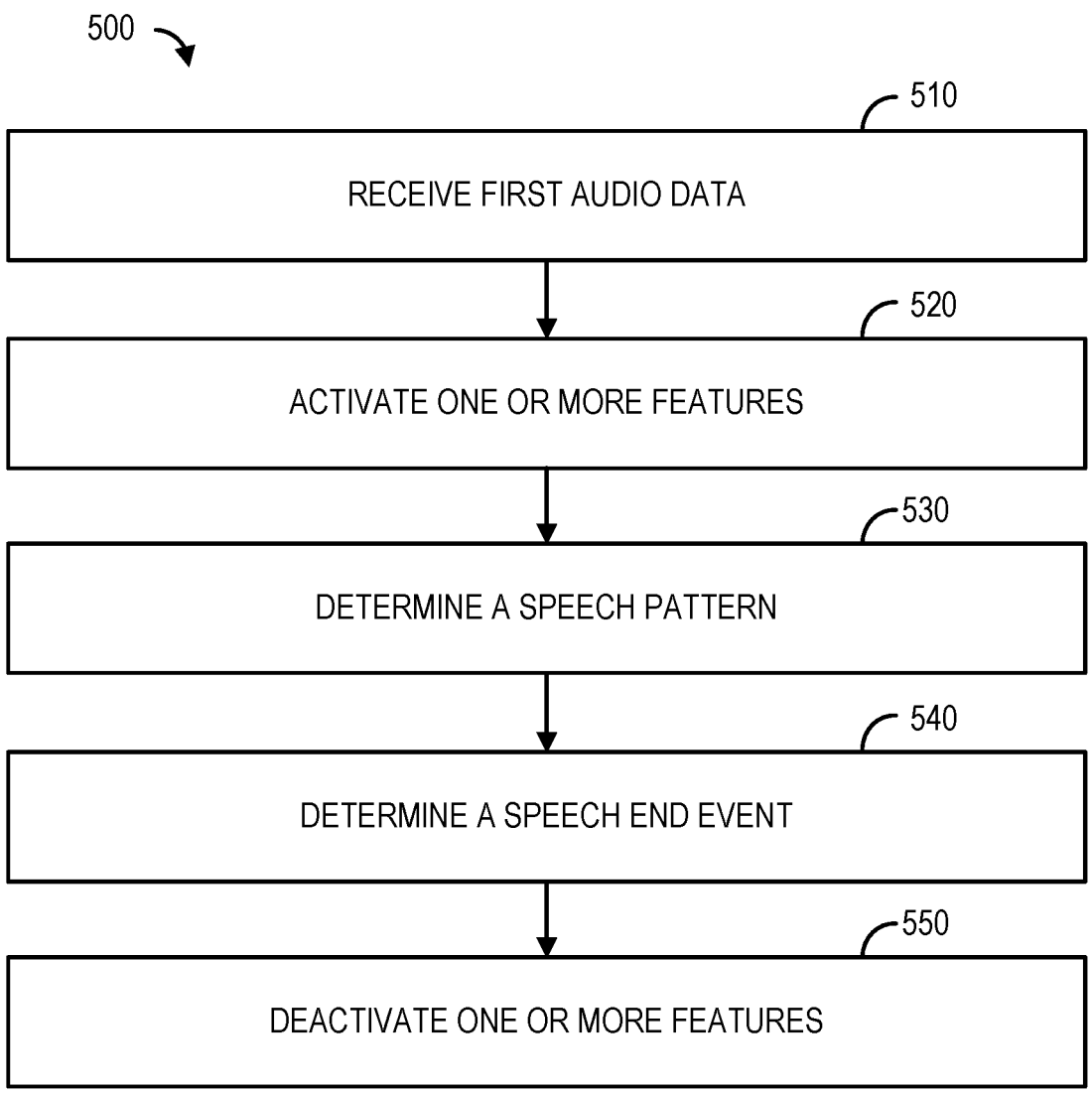

METHODS AND SYSTEMS FOR ENHANCED CONFERENCING

BACKGROUND

In videoconferencing, people may talk over each other, then stop, then talk over each other again. Moreover, during video conferencing normal social cues may not be as readily evident resulting in participants becoming frustrated by interruptions from other participants. Present systems merely provide user-activated mute features that do not take into account the nature of interruption events. For example, present systems do not analyze the content of an interruption. Present systems do not identify and incorporate unique speech patterns to determine whether a user is done speaking or merely pausing during speech.

SUMMARY

It is to be understood that both the following general description and the following detailed description is merely an example and is explanatory only and is not restrictive. Methods, systems, and apparatuses for enhanced conferencing are described. Teleconferences and video conferences may support features like mute features and highlight features. The one or more conference features may be activated or deactivated based on speech patterns of conference participants. For example, speech patterns may be used to distinguish between a user terminating speech or merely pausing during speech. Speech patterns may be used to determine the nature of an interruption event, distinguishing, for example, between affirmative interjections and negative interjections so as to intelligently activate the one or more teleconference features. Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles:

FIG. 5 is a flowchart of an example method.

DETAILED DESCRIPTION

Figure 1:
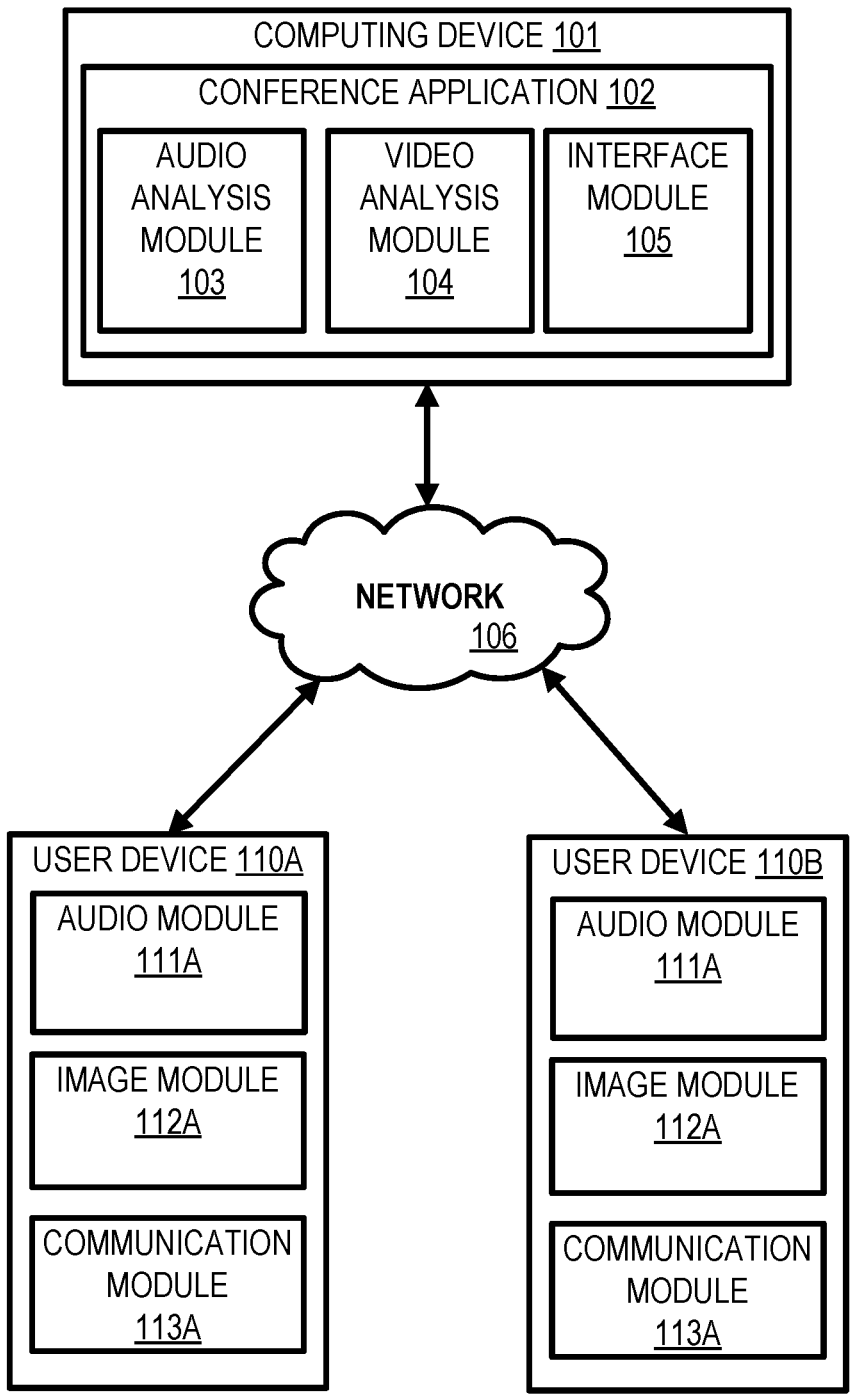
FIG. 1 is a block diagram of an example system and network.

Before the present techniques are disclosed and described, it is to be understood that this disclosure is not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" or "example" means "an example of" and is not intended to convey an indication of a preferred or ideal embodiment. "Such as" is not used in a restrictive sense, but for explanatory purposes.

Disclosed are components that can be used to perform the disclosed content analysis and storage techniques. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present systems and methods may be understood more readily by reference to the following detailed description of preferred embodiments and the examples included therein and to the Figures and their previous and following description.

As will be appreciated by one skilled in the art, the content analysis and storage techniques may take the form of an entirely hardware embodiment, an entirely software embodiment, or an embodiment combining software and hardware aspects. Furthermore, the content analysis and storage techniques may take the form of a computer program product on a computer-readable storage medium having computer-readable program instructions (e.g., computer software) embodied in the storage medium. More particularly, the present content analysis and storage techniques may take the form of web-implemented computer software. Any suitable computer-readable storage medium may be utilized including hard disks, CD-ROMs, optical storage devices, or magnetic storage devices.

Embodiments are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 shows an example system 100 in which the present methods and systems may operate. One skilled in the art will appreciate that provided herein is a functional description and that the respective functions can be performed by software, hardware, or a combination of software and hardware. The system 100 may facilitate enhanced conferencing.

The system 100 may comprise a computing device 101, a network 106, and one or more user devices 110A-B. The one or more user devices 110A-B may be configured to communicate with each other and/or with the computing device 101 through the network 106. While only user devices 110A-B are shown, it is to be understood the system 100 may comprise any number of user devices. Likewise, while only a single computing device 101 is shown, it is to be understood that the system 100 may comprise any number of computing devices.

The network 106 may comprise any telecommunications network such as the Internet or a local area network. Other forms of communications can be used such as wired or wireless telecommunication channels, for example. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

The computing device 101 may comprise a computer, a server, a laptop, a smart phone, or the like. The computing device 101 may be configured to send, receive, generate, store, or otherwise process data. The computing device 101 may comprise a conference application 102. The conference application 102 may comprise an audio analysis module 103, a video analysis module 104, and an interface module 105.

The conference application 102 may be configured to send, receive, store, or otherwise process audio data and/or video data. For example, the conference application 102 may receive first video data from a first source (e.g., the first user device), process the first video data, and output the first video data so as to be received by one or more other user devices associated with one or more other users (e.g., one or more teleconference participants). The teleconference application may be configured to receive first audio data from a first source (e.g., the first user device 110A), process the first audio data, and send the first audio data to one or more other user devices (e.g., the user device 110B). Similarly, the conference application 102 may receive second video data from a second source (e.g., the second user device), process the second video data, and output the second video data so as to be received by one or more other user devices associated with one or more other users (e.g., one or more teleconference participants). The conference application 102 may be configured to receive second audio data from a second source (e.g., the second user device 110B), process the first audio data, and send the first audio data to one or more other user devices (e.g., the user device 110A).

The conference application may be configured to output one or more interfaces on the one or more user devices 110A and 110B. For example, the one or more interfaces may comprise one or more interface elements. The one or more interface elements may be associated with the one or more user devices. For example, each interface element of the one or more interface elements may be associated with a user device of the one or more user devices. The one or more interface elements may be configured to output video data and/or audio data captured within one or more fields of view of the one or more user devices and/or by one or more microphones of the one or more user devices. For example, the interface may be configured to display one or more participants in the multi-device communication session (e.g., the video conference). The one or more interface elements may be configured to display additional information such as a user device identifier and/or a name associated with a user within the field of view of the user device.

The teleconference application may comprise one or more teleconference features. The one or more teleconference features may comprise one or more of: a mute feature, a highlight feature, a record feature, a message feature, a camera feature, and indicator feature, combinations thereof, and the like. The teleconference application may be configured to activate and/or deactivate the one or more teleconference features. The one or more teleconference features may comprise one or more of: a mute feature, a highlight feature, a record feature, a message feature, a camera feature, and indicator feature, combinations thereof, and the like.

The one or more teleconference features may be activated based on the first audio data. The one or more teleconference may be activated based on the first audio data. For example, the one or more teleconference features may be activated based on receipt of the first audio data. The one or more teleconference features may be activated automatically or manually. For example, the one or more teleconference features may be activated because the first audio data was received from a particular user device (e.g., the first user device). For example, a user associated with the first user device may activate the one or more teleconference features. For example, a mute feature may be activated. The mute feature may be configured to mute (e.g., block, prevent the output of) user utterances associated with one or more user devices and/or one or more conference participants.

The one or more teleconference features may activated or deactivated based on, for example, one or more speech events. For example, the one or more teleconference features may activated or deactivated based on determining a pause event or an end of speech event or any other event. For example, the computing device can analyze received audio data and/or text data and determine the one or more speech events based on one or more speech patterns. Determining the one or more speech patterns may comprise continuously analyzing the received first audio data. The one or more speech patterns may be determined, for example, by an artificial intelligence (AI) application that may determine and associate unique speech patterns for each user. The one or more determined speech patterns may change over time based on, for example, voice modularity, grammar, vocabulary, pronunciation, volume, context, syntax, accents, word usage or preference. For example, the received first audio data may be analyzed and compared to a stored idiolect associated with a user. Additionally and/or alternatively, the first audio data may be analyzed and compared to a general idiolect (e.g., an idiolect based a corpus). The comparison may include grammar, vocabulary, pronunciation, volume, context, syntax, accents, word usage or preference, combinations thereof, and the like. The aforementioned are exemplary and explanatory and are not intended to be limiting. The speech pattern may comprise one or more noise envelopes. Speech patterns may be determined based on each user and associated with that user. For example, each user may have different speech patterns. For example, each user may say certain words differently, may have different speech habits (e.g., a first user may frequently end sentences in "ummm" and a second user may frequently end sentences with "so . . . ").

Returning to the description of FIG. 1, the one or more user devices 110A-B may comprise one or more computers, laptops, smartphones, or other user devices. Each user device of the one or more user devices 110A-B may be associated with one or more user device identifiers. The one or more user device identifiers may comprise a string of letters, numbers, characters, or the like. For example, the one or more user device identifiers may comprise one or more media access control (MAC) addresses. The one or more user device identifiers may indicate (e.g., be associated with) one or more user accounts. The one or more user accounts may be subscription accounts, paid accounts, or the like. For example, a first user device 110A of the one or more user devices may be associated with a first user device identifier and a second user device 110B of the one or more user devices may be associated with a second user device identifier of the one or more user device identifiers.

Each user device of the one or more user devices 110A-B may comprise (e.g., be configured with) an audio module 111, an image module 112, and a communication module 113. With respect to each device and module, the audio module 111 may be configured to detect, receive, or otherwise determine an audio input and determine audio data. For example, the audio input may comprise a user speaking or some other noise. The audio module may comprise, for example, a microphone. The audio module may be configured to determine audio data associated with the audio input. The audio data may comprise amplitude, frequency, pitch, timbre, timing data, combinations thereof, and the like.

The video module 112 may configured to detect, receive, or otherwise determine a video input and determine video data. For example, the video input may comprise a video or other video data captured by an image capture device (e.g., a camera) associated with the user device. The audio module may be configured to determine video data associated with the video input. The video data may comprise motion data, lighting data, facial detection data, facial recognition data, object detection data, object recognition data, combinations thereof, and the like.

The communication module 113 may be configured for multi-device communication sessions. The communication module 113 may be configured to send and/or receive audio data and video data. For example, the communication module 113 may be configured to send data to and receive data from the computing device 101.

The conference application 102 may be configured to interface, for example through one or more Application Program Interfaces (APIs), with one or more applications and/or programs. For example, the conference application 102 may be configured to interface with and/or otherwise interact with the one or more underlying applications and/or one or more share applications. The one or more underlying application may comprise one or more native applications hosted on the user device 110A and/or 110B and/or the one or more applications may comprise browser-based applications hosted on a remote computing device.

The computing device 101 may be in communication with the one or more user devices 110A-B via the network 106. The computing device 101 may send and receive to and from the one or more user devices 110A-B via the network 106. For example, the computing device 101 may receive data from the communication module 113 of each user device of the one or more user devices 110A-B. The audio analysis module 103 may send, receive, store, generate, analyze, or otherwise process audio data received from the one or more user devices 110A-B. The audio analysis module 103 may be configured to determine an audio interruption event. For example, the audio analysis 103 may receive first audio data indicative of a first voice input received by the first user device 110A. The first audio data may comprise timing information indicating when the first voice input started.

Figure 2A:
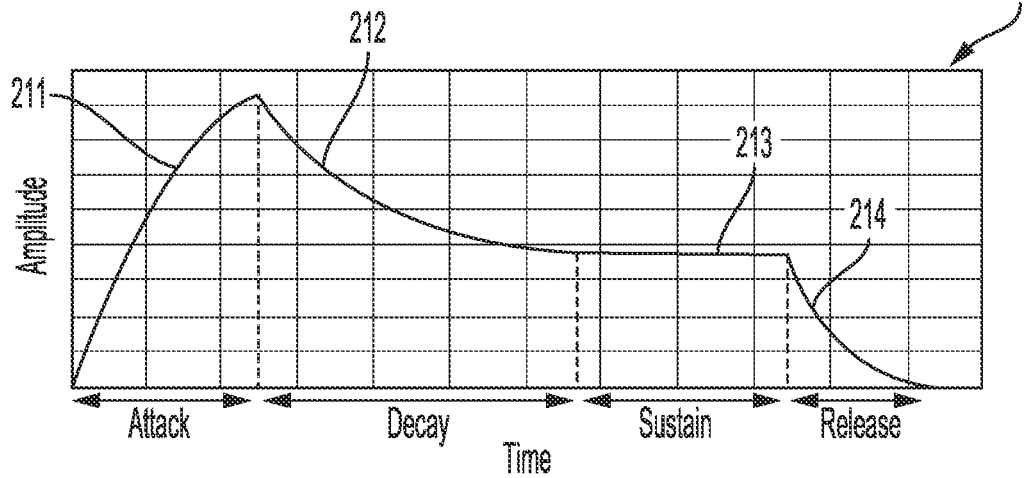
FIGS. 2A-2D show example speech patterns.

FIG. 2A shows an example audio envelope 210. The audio envelope 210 may indicate how a sound changes over time. It may relate to elements such as amplitude (volume), frequencies (with the use of filters), pitch and timing data. The audio analysis module may determine a first audio envelope associated with the first voice input. It may relate to elements such as amplitude (volume), frequencies (with the use of filters), pitch and timing data. The audio envelope may comprise one or more characteristics. For example, the audio envelope may comprise an attack, a decay, a sustain, and a release. The attack is the time taken for initial run-up of level from nil to peak and indicates the beginning of a voice input. For example, the attack may indicate the initial phase of a voice input received from a user device of the one or more user devices. The decay is the time taken for the subsequent run down from the attack level to the designated sustain level. For example, the decay may indicate a subsequent phase of the voice input wherein the voice input may decrease in energy towards a sustained speaking level. The sustain is the level during the main sequence of the sound's duration (e.g., the command) and may comprise the bulk the voice input. The release is the time taken for the level to decay from the sustain level to zero and indicates the end of the audio. The typical attack, sustain, and decay for each user and each word spoken may be determined and associated with the respective user.

The audio analysis module may subsequently receive second audio data indicating a second voice input received by the second user device 110B. The second audio data may comprise second timing data. It may be determined, based on the second timing data, that the second voice input was received during the first voice input. The audio analysis module 103 may determine a second audio envelope associated with the second voice input. The audio analysis module 103 may determine an interruption event if the second voice input occurs during the first voice input. For example, the audio analysis module 103 may determine the interruption event if the second voice input begins during any of the attack, decay, or sustain of the first audio envelope.

Based on determining the interruption event, the interface module 105 may adjust one or more conference features. For example, the interface module 105 may activate or deactivate a mute feature, may adjust the appearance of one or more interface elements, send one or more messages, cause one or more icons to be output, terminate the conference, changing one or more of: a size associated with the interface element, color associated with the interface element, a position of the interface element, a border associated with the interface element or any other characteristic or quality of the interface element, combinations thereof, and the like.

For example, it may be determined that the second voice input interrupted the first voice input. An output parameter of the interface element associated with the second user device may be adjusted to discourage participation (e.g., discourage future interruptions). For example, the second user may be muted, the interface element associated with the second user device may be positioned less prominently on the screen, reduced in size, or changed in some way so as to direct attention away from the second user interface element. One or more notifications may be sent to either or both of the user devices 110A-B. The one or more notifications may be output via the one or more user devices 110A-B. The one or more notifications may comprise one or more messages, one or more icons, combinations thereof, and the like. For example, the one or more notifications may be sent to the user device 110A indicating that a user of the user device 110B was the interrupter. Similarly, a notification may be sent to the user device 110B indicating that the user of 110B interrupted.

Figure 2B:
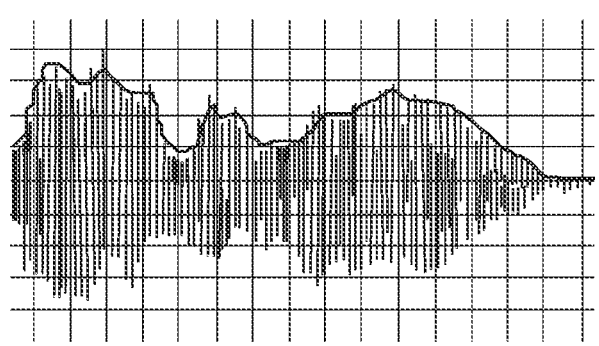

The one or more speech patterns may be determined by one or more voice recognition algorithms. For example, the one or more speech patterns may be determined based on pitch, tone, volume, or other acoustic or vocal characteristics of each speaker on the teleconference. For example, FIG. 2B shows changes in amplitude over time while a user speaks. The way a user speaks a certain word or phrase may be unique to that user and thus may be associated with the user and used to identify the user. The present methods and systems may also make use of Natural Language Processing (NLP) techniques. NLP techniques can be used to analyze the content of the speech, including the choice of words, sentence structure, and overall tone. Thus, patterns may be identified that are unique to each speaker, such as their preferred vocabulary, sentence structure, and even specific phrases or idioms they commonly use.

Figure 2C:
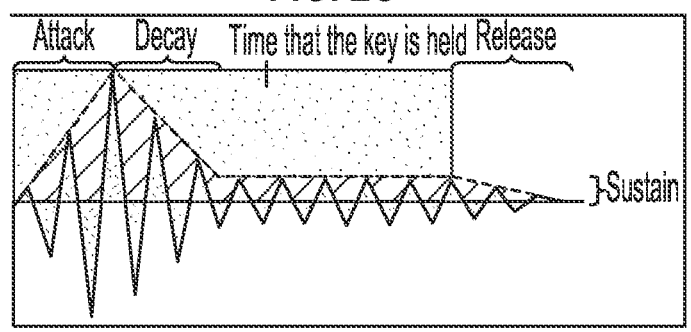

FIG. 2C shows another approximation of an audio envelope 230 as an example of acoustic analysis. Acoustic analysis may employed to analyze the sound waves produced by each speaker's voice to identify unique patterns in their speech, such as speech rate, pauses, and other acoustic cues that can be used to distinguish between different speakers. Historical speech data may be used to create a unique speech profile for each user, which the AI application can use to identify their speech patterns in real-time during teleconferences.

Figure 2D:
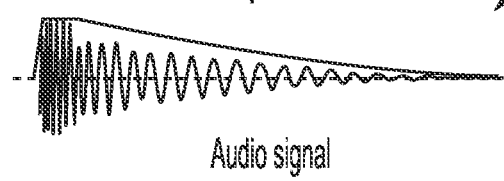

FIG. 2D shows an envelope follower as an example of using an audio signal in speaker recognition. One or more features may be extracted from the audio signal, such as the fundamental frequency, spectral envelope, and other acoustic features. This step involves converting the raw audio signal into a sequence of numerical features that can be processed by machine learning algorithms. A model can be trained using either a supervised or unsupervised approach, depending on the availability of labeled data. In supervised learning, the model is trained using labeled speech samples, while in unsupervised learning, the model learns to identify speakers without prior knowledge of their identities. Users may be enrolled in the system by collecting their voice samples and creating a unique voiceprint for each user. The voiceprint contains the unique features of each user's speech, which are used to recognize them in future interactions. Features of the incoming speech signal may be compared to the enrolled voiceprints in the database to identify the speaker. The model can use a variety of techniques, such as score normalization, distance metrics, and classification algorithms, to determine the closest match between the incoming speech signal and the enrolled voiceprints.

Figure 3A:
FIG. 3A-3C show example interfaces.

FIG. 3A shows an example user interface 310 associated with a teleconference application. For example, the computing device 102 may host a teleconference application. The teleconference application may be configured to send, receive, store, or otherwise process audio data and/or video data. For example, the teleconference application may receive first video data from a first source, process the first video data, and output the first video data so as to be received by one or more other user devices associated with one or more other users (e.g., one or more teleconference participants). The interface 310 may be associated with the one or more user devices. For example, the interface 310 may comprise one or more interface elements (e.g., interface elements 311-313). The one or more interface elements may be associated with one or more user devices. For example, each interface element of the one or more interface elements may be associated with a user device of the one or more user devices. For example, the interface element 311 may be associated with a first user device, the interface element 312 may be associated with a second user device, and the interface element 313 may be associated with a third user device. The one or more interface elements may be configured to display video data captured within one or more fields of view of the one or more user devices. For example, the interface may be configured to display one or more participants in the multi-device communication session (e.g., the video conference). The one or more interface elements may be configured to display additional information such as a user device identifier and/or a name associated with a user within the field of view of the user device.

The teleconference application may comprise one or more teleconference features. The one or more teleconference features may comprise one or more of: a mute feature, a highlight feature, a record feature, a message feature, a camera feature, and indicator feature, combinations thereof, and the like.

Figure 3B:
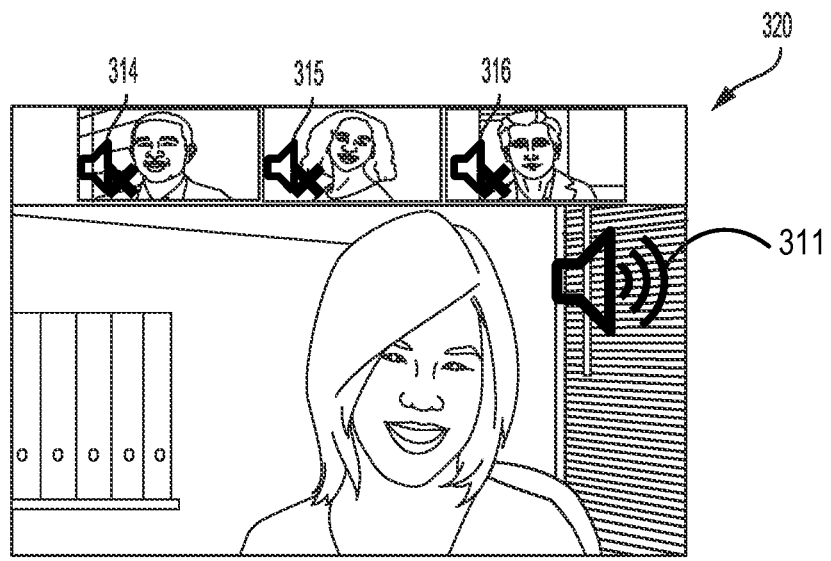

The teleconference application may be configured to activate and/or deactivate the one or more teleconference features. For example, FIG. 3B shows an example interface 320 wherein a speaking icon 311 is output based on audio received from the first user device. Meanwhile, icons 314, 315, and 316 indicate one or more other users may be muted.

FIG. 3B shows an example interface 320 comprising interface where one user is show is displayed larger than other users. For example, this teleconference feature may indicate a current speaker. Other users may understand this indication to mean that users other than the current speaker will be muted.

Figure 3C:

Similarly, FIG. 3C shows an example interface 330 comprising interface The interface 330 shows a scenario wherein the interface element 331 has been moved to a position of prominence (e.g., pulled forward) with respect to other interface elements.

Figures 4A, 4B:
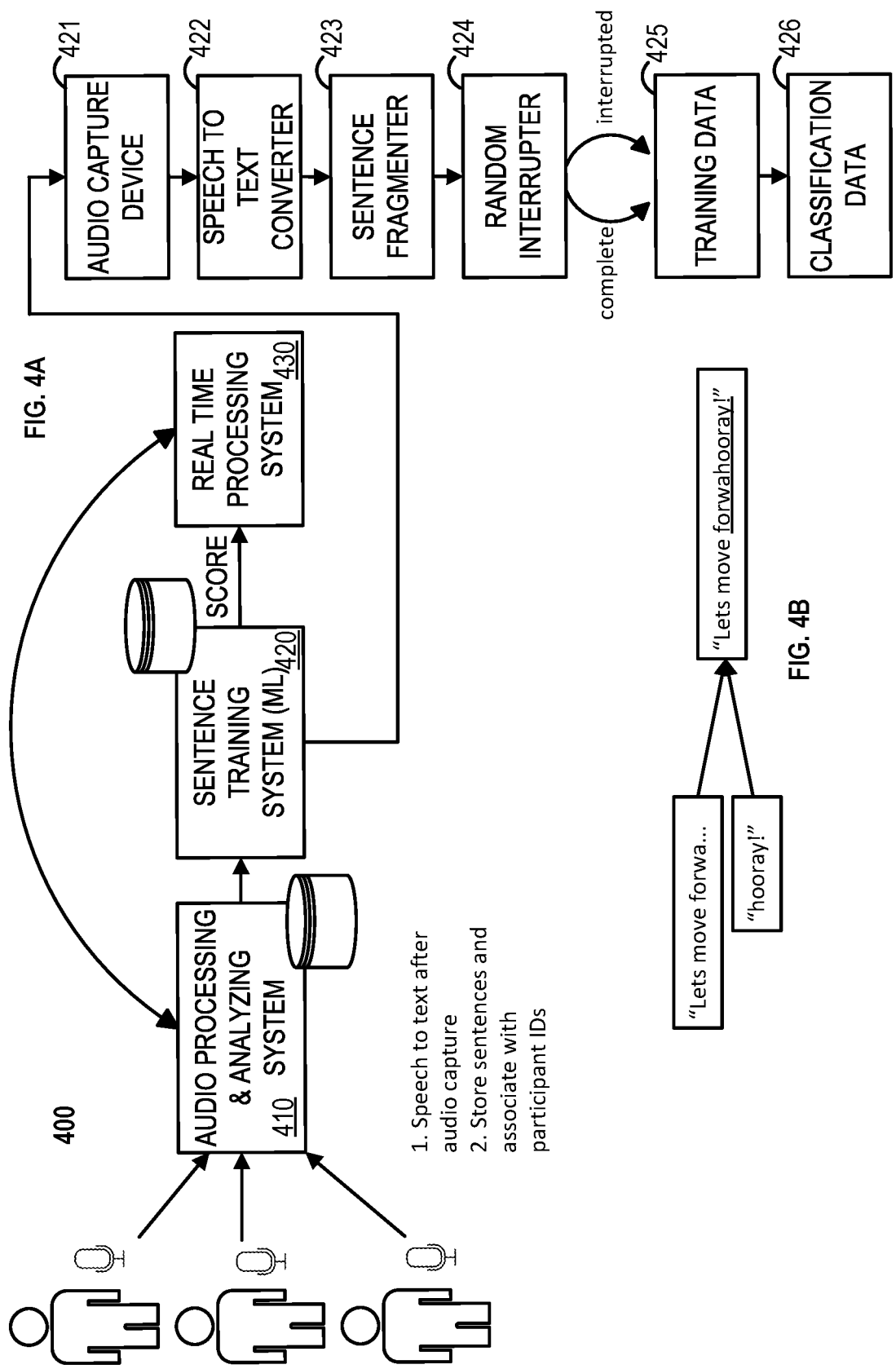
FIG. 4A shows an example system.
FIG. 4B shows an example speech collision.

FIG. 4A shows an example system 400. The system 400 may comprise an audio processing and analyzing system 410, a sentence training system 420, and a real-time processing system 430. The processing and analyzing system 410 may receive one or more inputs. The one or more inputs may comprise one or more inputs, voice inputs (e.g., speech, tokenized words), one or more speech characteristics (e.g., pitch, tone, speed of speech), audio data, combinations thereof, and the like. The sentence training system 420 may comprise a machine learning component.

The audio processing and analyzing system 410 may be configured to capture and/or receive audio from one or more users (e.g., one or more teleconference participants). The audio processing and analyzing system 410 may be configured to convert captured audio to text. The audio processing and analyzing system 410 may be configured to perform analysis of the text of the converted captured audio. The audio processing and analyzing system 410 may be configured to store one or more sentences in a database. The audio processing and analyzing system 410 may be configured to assign unique identifiers to each user of the one or more users.

The sentence training system 420 may be configured for training a text-input model for each participant. The sentence training system may comprise one or more components, sub-systems, computing devices, combinations thereof, and the like. For example, the sentence training system 420 may comprise one or more of an audio capture device 421, a speech to text converter 422, a sentence fragmenter 423, a random interrupter 424, training data 425, classification data 426, combinations thereof, and the like. The sentence training system may retrieve text stored by the audio processing and analyzing system 410. The sentence training system 420 may be configured to randomly select one or more sentences and randomly truncate (e.g., interrupt) the one or more sentences. The sentence training system 420 may be configured to train a classification model to predict whether a given input (e.g., a text sentence) is a full sentence or a fragment sentence. For example, audio data may be collected. The audio data may include instances of complete sentences and incomplete sentences as well as instances where a user is done speaking and instances where a user is merely pausing. Signal processing techniques such as Fourier transforms may be used to extract features from the audio data that are relevant to differentiating between pauses and the end of sentences or complete sentences. Features may include the duration of the pause, the frequency spectrum of the audio signal, the amplitude envelope of the audio signal (e.g., the audio envelope), combinations thereof, and the like. The audio data may be labeled to indicate whether each segment represents a pause or the end of a sentence or complete thought. This labeled data may be used to train the machine learning algorithm. The labeled data may be split into a training set and a validation set. The training set may be used to train the machine learning algorithm, while the validation set may be used to evaluate the performance of the trained model. A binary classification model (e.g., a logistic regression, a support vector machine (SVM), a decision tree, a random forest, naïve Bayes, neural network, combinations thereof, and the like) may be trained on the extracted audio features and labeled training data. The performance of the model may be evaluated and parameters adjusted until the performance is satisfactory.

The system 400 may comprise a system for identifying interjections. The system for identifying interjections may be configured to accept one or more text inputs. for example, the system for identifying interjections may be configured to receive the one or more text inputs, tokenize the one or more text inputs by combining them, and determining that the combined one or more text inputs comprise one or more interjections. The system for identifying interjections may be configured to determine score indicating a likelihood (e.g., a probability) that any given portion of text comprises an interjection.

The audio capture device 421 may be configured to send audio to the speech to text converter 422. The speech to text converter 422 may be configured to output text. The speech to text converter may be configured to determine one or more sentences. The sentence fragmenter 423 may be configured to receive the text from the speech to text converter 422. The sentence fragmenter 423 may be configured to fragment (e.g., truncate, interrupt, or otherwise cut short) the one or more sentences. The random interrupter 424 may determine one or more complete sentences and one or more incomplete sentences (e.g., an interrupted sentence, a paused sentence, a sentence ended before completion, combinations thereof, and the like). The complete sentences and incomplete sentences, and/or indications thereof, may be included in training data 425. Labeled data may be determined. The labeled data may be sent to the classification model 426.

The real-time processing system 430 may be configured to receive the captured audio. The real-time processing system 430 may be configured to determine one or more words, and send the one or more words to the trained model. The real-time processing system 430 may receive the score indicating the likelihood that the given portion of text comprises an interjection. The real-time processing system 430 may be configured to determine one or more speech collisions. For example, the real-time processing system 430 may be configured to continuously analyze the received audio and determine one or more users are speaking at essentially the same time (e.g., within close temporal proximity). The real-time processing system 430 may be configured to determine a score indicating a likelihood that the speech is incomplete. The real-time processing system 430 may be configured to determine a likelihood that interrupting speech comprises an interjection or does not comprise an interjection. The real-time processing system 430 may be configured to record a potential interruption. The system 400 may be configured to output the recorded interruption.

FIG. 4B shows an example speech collision and speech to text failure. The speech collision and speech to text failure may be determined by one or more of the devices described herein such as those of FIG. 1, FIG. 4, and/or FIG. 9. A first user device may process a first spoken voice input and convert one or more analog signals to one or more digital signals. The first user device may be configured to convert speech to text (e.g., voice to text). The first user device may be configured for natural language processing and/or natural language understanding. The first user device may be configured to send the one or more digital signals to a computing device for processing. Similarly, a second user device may process a second spoken voice input and convert one or more analog signals to one or more digital signals. The second user device may be configured to convert speech to text (e.g., voice to text). The second user device may be configured for natural language processing and/or natural language understanding. The second user device may be configured to send the one or more digital signals to a computing device for processing. The computing device may be configured for natural language processing/natural language understanding.

The speech collision may comprise the first portion of text "let's move forwa . . . " and the second portion of text "hooray!" The first portion of text may be associated with a portion of a first user utterance. The portion of the first user utterance may be a portion of a first user utterance determined by (e.g., detected by, processed by) a first user device. For example, the first user device may receive the first spoken voice input spoken by a first user associated with the first user device. The portion of the first user utterance may be converted to text. Similarly the portion of the second user utterance may be converted to text. The portion of the first user utterance and the portion of the second utterance may be tokenized, stringed, and/or linearized such that the two portions are processed so as to generate a string of text. The result of the conversion may be a combination of the two portions. For example, a combination of "let's move forwa . . . " and "hooray!" may be tokenized as "let's move forwahooray!" The system 400 may determine a speech to text failure as "forwahooray!" is not a word (at least not in English). This determination may be indicated as speech to text conversion failure and may indicate an interruption event.

The speech collision may comprise speech originating from different users wherein the different users are associated with different user devices. For example, a first portion of speech may be received from a first user device and/or may be determined to be associated with a first user. A second portion of speech may be received at approximately the same time from a second user device and/or may be determined to be associated with a second user. Arrival of (e.g., receipt of) the two different portions of speech from two different devices (e.g., from two different users) may indicate an interruption event.

FIG. 5 shows an example method 500, executing on one or more of the devices of FIG. 1. At 510, first audio data may be received. For example, a computing device may receive the first audio data. For example, the first audio data may be sent by (or otherwise associated with) a first user device. The first user device may comprise one or more microphones. The first user device may be configured to determine (e.g., receive, capture, detect) one or more audio inputs. The one or more audio inputs may comprise, for example, one or more spoken voice inputs. The first user device may be configured to receive one or more analog signals (e.g., the one or more spoken voice inputs) and convert the one or more analog signals to one or more digital signals (e.g., by performing analog to digital conversion). The first user device may be configured to determine, based on the one or more spoken voice inputs, one or more user utterances. The first user device may be configured to send the one or more digital signals to, for example, the computing device. The first user device may send the one or more digital signals to the computing device via a network.

The computing device may host a teleconference application. The teleconference application may be configured to send, receive, store, or otherwise process audio data and/or video data. The teleconference application may comprise one or more teleconference features. The one or more teleconference features may comprise one or more of: a mute feature, a highlight feature, a record feature, a message feature, a camera feature, and indicator feature, combinations thereof, and the like.

At 520, one or more teleconference features may be activated. The one or more teleconference features may comprise one or more of: a mute feature, a highlight feature, a record feature, a message feature, a camera feature, an indicator feature, combinations thereof, and the like. The one or more teleconference features may be activated based on the first audio data. The one or more teleconference may be activated based on second audio data. For example, the one or more teleconference features may be activated based on receipt of the first audio data. The one or more teleconference features may be activated automatically or manually. For example, the one or more teleconference features may be activated because the first audio data was received from a particular user device (e.g., the first user device). For example, a user associated with the first user device may activate the one or more teleconference features. For example, a mute feature may be activated. The mute feature may be configured to mute (e.g., block, prevent the output of) user utterances associated with one or more user devices and/or one or more conference participants. For example, one or more users on a teleconference may be initially (e.g., proactively) muted. For example, audio received from those users may not be output to other users on the call.

At 530, one or more speech pattern may be determined. The one or more speech patterns may comprise one or more idiolects associated with a user of the first user device. The one or more speech patterns may comprise a speech pause event, a speech end event, an audio envelope, a manner of speaking, combinations thereof, and the like. Determining the one or more speech patterns may comprise continuously analyzing the received first audio data. For example, the received first audio data may be analyzed and compared to a stored idiolect associated with a user. Additionally and/or alternatively, the first audio data may be analyzed and compared to a general idiolect (e.g., an idiolect based a corpus). The comparison may include grammar, vocabulary, pronunciation, volume, context, syntax, accents, word usage or preference, combinations thereof, and the like. The aforementioned are exemplary and explanatory and are not intended to be limiting. The speech pattern may comprise one or more noise envelopes.

At 540, a speech end event may be determined. For example, the computing device may determine the speech end event. For example, the first user device may determine the speech end event and send an indication of the speech end event to the computing device. The speech end event may be determined based on the first audio data and the speech pattern. The speech end event may be determined based on a likelihood that a user (e.g., the first user, one or more other teleconference participants) is done speaking (as opposed to simply pausing). The speech end even\t may be determined based on the likelihood that the user is done speaking exceeds a threshold.

At 550, the one or more teleconference features may be deactivated. Deactivating the one or more teleconference features may comprise, for example, turning off a mute feature and thereby allowing output of audio originating from other users or user devices. The one or more teleconference features may be deactivated based on the speech event. For example, if the mute feature was activated based on receiving the first audio data, the mute feature may be deactivated based on determining the speech end event.

The method may comprise determining, based on the first audio source, a pause pattern. The method may comprise outputting one or more indications. For example, the one or more indications may be output based on determining the pause pattern. The method may comprise receiving second audio data associated with a second audio source. The method may comprise determining, based on the second audio data, a speech to context conversion error, an interruption event. The method may comprise activating, based on the interruption event, the one or more teleconference features. Activating the one or more teleconference features may comprise activating a mute feature configured to prevent output of audio, activating a highlight feature configured to highlight one or more interface elements associated with a teleconference, activating a messaging teleconference feature configured to receive and/or output one or more messages, activating an icon feature configured to cause output of one or more icons (e.g., one or more visual indications of the interruption event).

Figure 6:
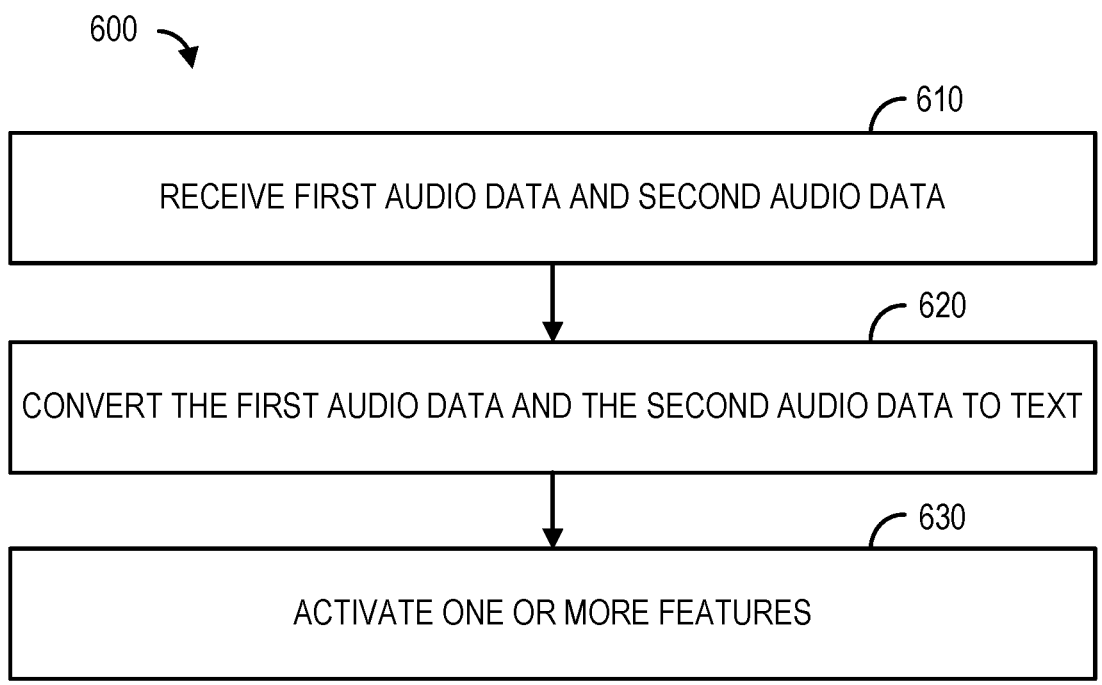
FIG. 6 is a flowchart of an example method.

FIG. 6 shows an example method 600. The method may be carried out via one or more devices described herein. At 610, first audio data and second audio data may be received. The first audio data may be associated with a first source. The second audio data may be associated with a second source. For example, the first audio may be sent by a first user device and received by a computing device. Similarly, the second audio data may be sent by a second user device and received by the computing device. The computing device may host a teleconference application. The teleconference application may be configured to send, receive, store, or otherwise process audio data and/or video data. The teleconference application may comprise one or more teleconference features. The one or more teleconference features may comprise one or more of: a mute feature, a highlight feature, a record feature, a message feature, a camera feature, and indicator feature, combinations thereof, and the like.

The first audio data may comprise a first voice input. The second audio data may comprise a second user input. The first user device and the second user device may be configured to convert analog user inputs (e.g., spoken words) to one or more digital signals and send the digital signals over a network (e.g., the network 106.

At 620, the first audio data and the second audio data may be converted to text. Either or both user devices, as well as the computing device may be configured for speech to text conversion. The first user device and the second user device may be configured to receive analog inputs such as spoken words, convert the spoken words, to one or more digital signals, and perform natural language processing, natural language understanding, voice-to-text, or other similar techniques to determine one or more user utterances. Similarly, the computing device may be configured to receive the one or more digital signals (e.g., associated with spoken words), and perform natural language processing, natural language understanding, voice-to-text, or other similar techniques to determine one or more user utterances.

At 630, one or more teleconference features may be activated. For example, the mute feature may be activated. For example, the teleconference feature may be configured such that if it is determined the second audio data comprises an affirmative interjection, the mute feature may be activated because there is no disagreement with what is being said. For example, the teleconference may be configured to allow only negative interjections so that meeting participants are aware there is disagreement among the speakers but may be configured to ignore user inputs indicating general agreement. Thus, activating or deactivating the one or more teleconference features may be based, in some part, on the content, context, and/or syntax of the interrupting voice input (e.g., the second voice input).

For example, the teleconference may be configured to allow only positive (e.g., affirming) interjections so that disagreeing points of view are not heard. For example, negative interjections may be muted and positive interjections may be allowed. The aforementioned examples are not intended to be limiting and a person skilled in the art will appreciate any and all configurations are contemplated herein.

The method may comprise determining a likelihood a speaker (e.g., a user associated with the first user device or "first user") is done speaking (as opposed to simply pausing). The method may comprise determining a speech-to-text conversion failure as described herein. The method may comprise determining the second audio data comprises an affirmative interjection. The method may comprise deactivating the one or more teleconference features.

Figure 7:
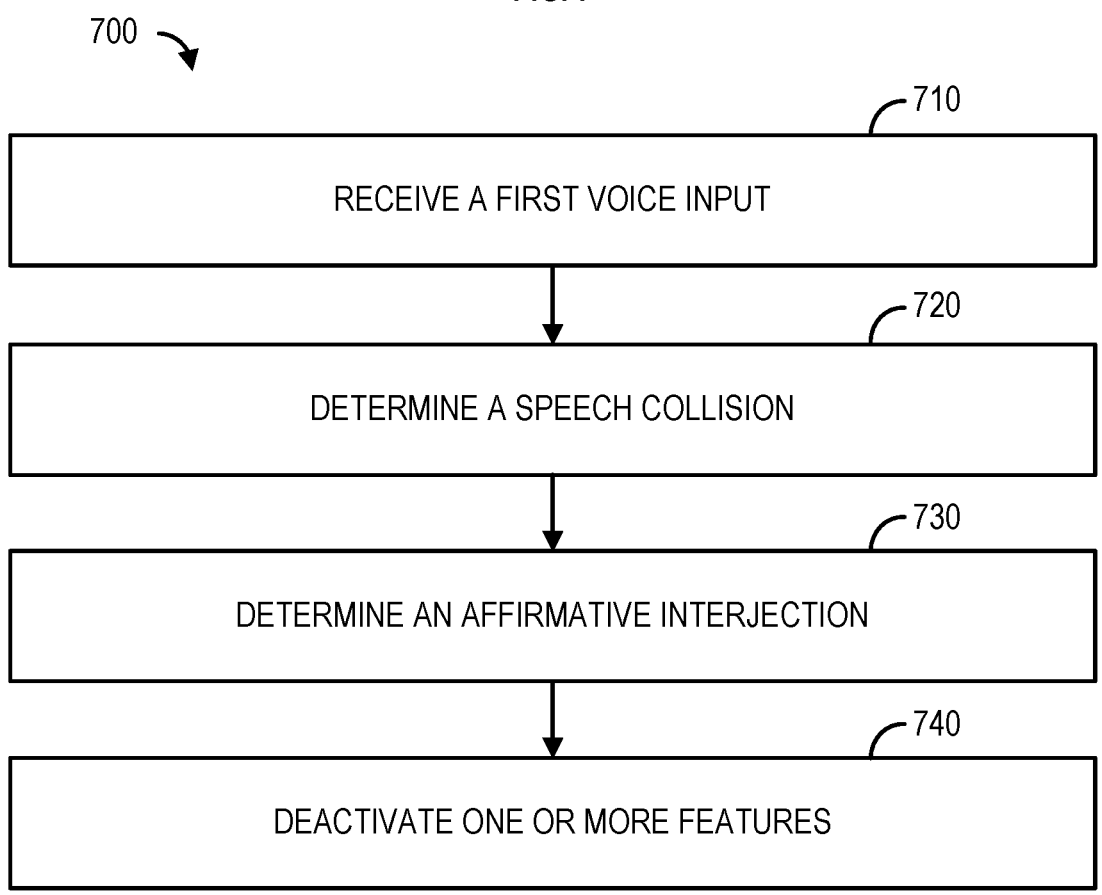
FIG. 7 is a flowchart of an example method.

FIG. 7 shows an example method 700. The method 700 may be carried out via one or more of the devices described herein. At 710, a first voice input may be received and a second voice input may be received. For example, the first voice input may be associated with a first audio source. The first audio source may comprise a first user device. The first voice input may comprise one or more user utterances from a first user. The second voice input may be received from (or otherwise associated with) a second audio source. For example the second audio source may comprise a second user device. For example, the second voice input may be received from the second user device.

The first voice input may be associated with first timing data. The first timing data may indicate a start time for the voice input (e.g., a time at which an analog signal associated with the first voice input was received by the first user device and/or a time at which the analog to digital converted signal is received by the computing device). Similarly, the second voice input may be associated with the second timing data. The second timing data may indicate a start time for the voice input (e.g., a time at which an analog signal associated with the second voice input was received by the second user device and/or a time at which the analog to digital converted signal is received by the computing device).

The first voice input and the second voice input may be received by a computing device. For example, the computing device may host a teleconference application. The teleconference application may be configured to send, receive, store, or otherwise process audio data and/or video data. The teleconference application may comprise one or more teleconference features. The one or more teleconference features may comprise one or more of: a mute feature, a highlight feature, a record feature, a message feature, a camera feature, and indicator feature, combinations thereof, and the like. One or more teleconference features may be activated. For example, when a first user is speaking, the mute feature may be activated for (e.g., with respect to) one or more other teleconference participants.

At 720, a speech collision may be determined. The speech collision may indicate the second voice input was received during receipt and/or processing of the first voice input. For example, the speech collision may be the result of a second user associated with the second audio source interrupting a first user associated with the first audio source. The speech collision may be determined based on the first and/or second timing data. For example, the speech collision may be determined because the second voice input was received during receipt and/or processing of the first voice input.

At 730, it may be determined that the second voice input comprises an affirmation and/or an affirmative interjection. The affirmation may indicate the second user's agreement with something said by the first user. Examples of interjections include: "aha," "ahem," "ahh," "dang," "darn," "gee," "gosh," "goodness," hmm," "mmm," "ummmm," "yeah," "sure," combinations thereof, and the like. It is to be understood this is an incomplete list. An interjection is a word, phrase, or expression that occurs as an utterance and expresses a (typically spontaneous) feeling or reaction. Interjections include many different parts of speech, such as exclamations, curses, greetings, response particles, hesitation markers, and other words. Similarly, it may be determined that the interjection is a negative interjection expressing, for example, disagreement (e.g., "drat," "darn," "shoot," "blah," or the like.)

At 740, one or more teleconference features may be deactivated. For example, the mute feature may be deactivated. For example, the teleconference feature may be configured such that if it is determined the second voice input is an affirmative interjection, the mute feature may be deactivated to allow teleconference participants to hear the affirmative interjection. For example, an allowable interjection may occur when a first user is asking a question, and a second user answers the question (e.g., "yes" or "no") before the first user has completed the inquiry. On the other hand, the teleconference may be configured to allow only negative interjections so that meeting participants are aware there is disagreement among the speakers. Thus, activating or deactivating the one or more teleconference features may be based, in some part, on the content, context, and/or syntax of the interrupting voice input (e.g., the second voice input). The aforementioned examples are not intended to be limiting and a person skilled in the art will appreciate any and all configurations are contemplated herein.

The method may comprise activating the one or more teleconference features. The method may comprise determining a likelihood that the first user is done speaking. The method may comprise determining a speech end event. The method may comprise determining a speech pause event. For example, based on a speech pattern, it may be determined that the first user, despite pausing during speaking, intends to continue speaking (e.g., is not done speaking).

Figure 8:
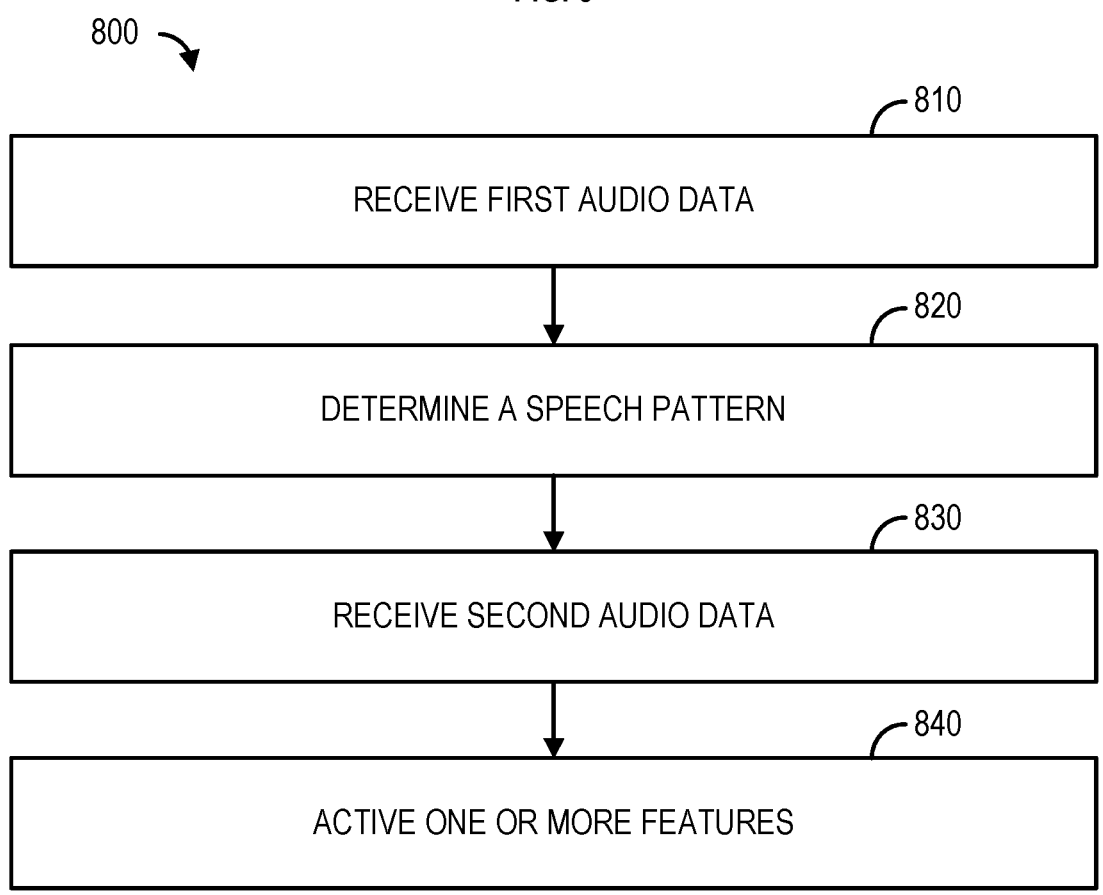
FIG. 8 is a flowchart of an example method.

FIG. 8 shows an example method 800. The method 800 may be carried out via one or more devices described herein. At 810, first audio data may be received. For example, the first audio day may be received by a computing device. For example, the first audio data may be sent by (or otherwise associated with) a first audio source (e.g., a first user device). The first audio data may be associated with the first audio source. The first audio data may comprise one or more voice inputs. For example, the first audio data may comprise one or more user utterances received by the first user device.

The first user device may comprise a voice enabled device. For example, the first user device may comprise one or more microphones. The first user device may be configured to convert received analog audio to one or more digital signals. Either or both of the first user device or the computing device may be configured to convert text to speech. The first audio data may comprise first timing data.

The computing device may be configured to host a teleconference application. The teleconference application may be configured to receive and analyze audio data. The teleconference application may be configured to send and receive audio data and video data. The teleconference application may comprise one or more teleconference features. For example, the one or more teleconference features may comprise a mute feature, a highlight feature, a record feature, a message feature, an indicator feature, a camera feature, combinations thereof, and the like.

At 820, a speech pattern may be determined. The speech pattern may comprise one or more idiolects associated with a user of the first user device. The speech pattern may comprise a speech pause event, a speech end event, an audio envelope, a manner of speaking, combinations thereof, and the like. Determining the speech pattern may comprise continuously analyzing the received first audio data.

At 830, second audio data may be received. For example, the second audio day may be received by the computing device. For example, the second audio data may be sent by (or otherwise associated with) a second audio source (e.g., a second user device). The second audio data may be associated with the second audio source. The second audio data may comprise one or more voice inputs. For example, the second audio data may comprise one or more user utterances received by the second user device. The second user device may comprise a voice enabled device. For example, the second user device may comprise one or more microphones. The second user device may be configured to convert received analog audio to one or more digital signals. The second user device may be configured to convert text to speech. The second audio data may comprise first timing data.

At 840, one or more teleconference features may be activated. The one or more teleconference features may be activated based on the text comprising an interruption event. The interruption event may be determined based on the text. For example, the first audio data may comprise a first voice input and the second audio may comprise a second voice input. The first voice input may be converted to text and the second voice input may be converted to text. The second voice input may be received during receipt of the first voice input and this may result in a speech to text conversion error. The speech to text conversion error may be determined when the speech to text conversion results in a grammatical or linguistic error such as an unrecognized word or phrase. For example, it may be determined the first voice input comprises a portion of a first utterance such as a portion of a first word. It may be determined the second voice input comprises a portion of a second utterance (e.g., a second word). It may be determined that the combination of the portion of the first word and the portion of the second word is not itself or otherwise does not fit in the context or syntax of the first voice input.

The method may comprise converting the speech to text. The method may further comprise determining, based on the first audio data, one or more phonemes. The method may comprise determining, based on the one or more phonemes, one or more user utterances. The method may comprise determining, based on the one or more user utterances, context and syntax associated with the one or more user utterances. The method may comprise determining first timing data associated with the first audio data and second timing data associated with the second audio data. The method may comprise determining based on the first timing data and the second timing data, an interruption event. The method may comprise activating, based on the interruption event the one or more teleconference features.

Figure 9:
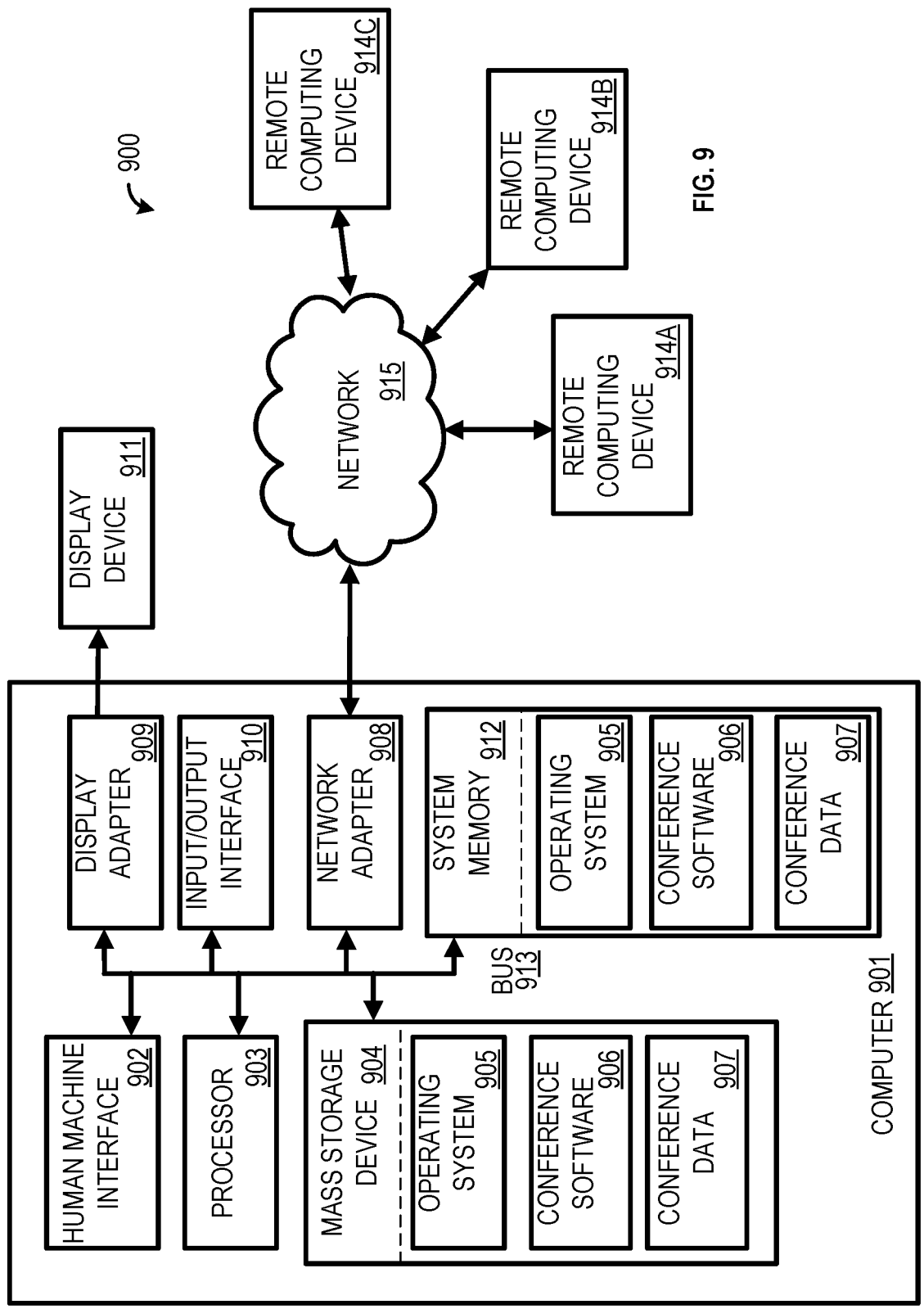
FIG. 9 is a block diagram of an example computing device.

The above described disclosure may be implemented on a computer 901 as illustrated in FIG. 9 and described below. FIG. 9 is a block diagram illustrating an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

The present disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Examples comprise set top boxes, programmable consumer electronics, network PCs, minicomputers, mainframe computers, distributed computing environments that comprise any of the above systems or devices, and the like.

The processing of the disclosed can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors 903, a system memory 912, and a system bus 913 that couples various system components including the one or more processors 903 to the system memory 912. The system can utilize parallel computing.

The system bus 913 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 913, and all buses specified in this description can also be implemented over a wired or wireless network connection and each of the subsystems, including the one or more processors 903, a mass storage device 904, an operating system 905, conference software 906, conference data 907, a network adapter 908, the system memory 912, an Input/Output Interface 910, a display adapter 909, a display device 911, and a human machine interface 902, can be contained within one or more remote computing devices 914A, 914B, 914C at physically separate locations, connected through buses of this form, in effect implementing a fully distributed system.

The computer 901 typically comprises a variety of computer readable media. Example readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as the conference data 907 and/or program modules such as the operating system 905 and the conference software 906 that are immediately accessible to and/or are presently operated on by the one or more processors 903.

The computer 901 can also comprise other removable/non-removable, volatile/non-volatile computer storage media. By way of example, FIG. 9 illustrates the mass storage device 904 which can facilitate non-volatile storage of computer code, computer readable instructions, data structures, program modules, and other data for the computer 901. For example and not meant to be limiting, the mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, the operating system 905 and the conference software 906. Each of the operating system 905 and the conference software 906 (or some combination thereof) can comprise elements of the programming and the computing task software 906. The conference data 907 can also be stored on the mass storage device 904. The conference data 907 can be stored in any of one or more databases known in the art. Examples of such databases comprise, DB2®, Microsoft® Access, Microsoft® SQL Server, Oracle®, mySQL, PostgreSQL, Mongo, Cassandra, or any SQL, non-SQL, in-memory data structure store, distributed data structure store, key-value database, combinations thereof, and the like. The databases can be centralized or distributed across multiple systems.

The user or device can enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 903 via the human machine interface 902 that is coupled to the system bus 913, but can be connected by other interface and bus structures, such as a parallel port, game port, an IEEE 1394 Port (also known as a Firewire port), a serial port, or a universal serial bus (USB).

The display device 911 can also be connected to the system bus 913 via an interface, such as the display adapter 909. It is contemplated that the computer 901 can have more than one display adapter 909 and the computer 901 can have more than one display device 911. For example, the display device 911 can be a monitor, an LCD (Liquid Crystal Display), an augmented reality (AR) display, a virtual reality (VR) display, a projector, combinations thereof, and the like. In addition to the display device 911, other output peripheral devices can comprise components such as speakers (not shown) and a printer (not shown) which can be connected to the computer 901 via the Input/Output Interface 910. Any step and/or result of the methods can be output in any form to an output device. Such output can be any form of visual representation, including, but not limited to, textual, graphical, animation, audio, tactile, and the like. The display device 911 and computer 901 can be part of one device, or separate devices.

The computer 901 can operate in a networked environment using logical connections to one or more remote computing devices 914A, 914B, 914C. By way of example, a remote computing device can be a gaming system, personal computer, portable computer, smartphone, a server, a router, a network computer, a peer device or other common network node, and so on. Logical connections between the computer 901 and a remote computing device 914A, 914B, 914C can be made via a network 915, such as a local area network (LAN) and/or a general wide area network (WAN). Such network connections can be through the network adapter 908. The network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components reside at various times in different storage components of the computing device 901, and are executed by the one or more processors 903 of the computer. An implementation of the conference software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The disclosure can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the disclosure has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as an example only, with a true scope and spirit being indicated by the following claims.

What is claimed is:

1. A method comprising:
   receiving first audio data associated with a first audio source;
   based on receiving the first audio data, activating one or more teleconference features;
   determining, based on the first audio source, a speech pattern;
   determining, based on the first audio data and the speech pattern, a speech end event; and
   deactivating, based on the speech end event, the one or more teleconference features.

2. The method of claim 1, wherein the first audio data comprises a first voice input.

3. The method of claim 1, wherein the speech pattern comprises a stored idiolect associated with a user.

4. The method of claim 1, wherein determining the speech end event comprises continuously analyzing the first audio data to determine a user associated with the first audio source has finished speaking.

5. The method of claim 1, further comprising:
   determining, based on the first audio source, a pause pattern; and
   based on determining the pause pattern, outputting one or more indications configured to indicate a user associated with the first audio source has paused speaking.

6. The method of claim 1, wherein the one or more teleconference features comprises one or more of: a mute feature, a highlight feature, a record feature, a message feature, or a camera feature.

7. The method of claim 1, further comprising:
   receiving second audio data associated with a second audio source;
   determining, based on the second audio data, a speech to context conversion error, an interruption event; and
   activating, based on the interruption event, the one or more teleconference features.

8. A method comprising:
   receiving first audio data associated with a first source and second audio data associated with a second source;
   converting the first audio data and second audio data to text; and
   based on the text comprising an interruption event, activating one or more teleconference features.

9. The method of claim 8, wherein the first audio data comprises a first voice input and wherein the second audio data comprises a second voice input.

10. The method of claim 8, wherein converting the first audio data and the second audio data to text comprises performing a speech-to-text conversion.

11. The method of claim 8, wherein the one or more teleconference features comprises one or more of: a mute feature, a highlight feature, a record feature, a message feature, an indicator feature, or a camera feature.

12. The method of claim 8, wherein determining the interruption event comprises determining one or more of: determining a likelihood a first speaker is not done speaking, or determining a speech-to-text conversion failure.

13. The method of claim 8, wherein activating the one or more teleconference features comprises activating a mute feature configured to prevent output of audio, activating a highlight feature configured to highlight one or more interface elements associated with a teleconference, activating a messaging teleconference feature configured to receive and/or output one or more messages, activating an icon feature configured to cause output of one or more icons.

14. The method of claim 8, further comprising:
determining the second audio data comprises an affirmative interjection; and
deactivating the one or more teleconference features.

15. A method comprising:
receiving a first voice input and a second voice input;
determining, based on the first voice input and the second voice input, a speech collision;
determining, based on the speech collision, that the second voice input comprises an affirmative interjection; and
deactivating one or more teleconference features.

16. The method of claim 15, wherein the first voice input is received from a first source and the second voice input is received from a second source and wherein the one or more teleconference features comprises one or more of: a mute feature, a highlight feature, a record feature, a message feature, an indicator feature, or a camera feature.

17. The method of claim 15, wherein determining the speech collision comprises one or more of: determining the first voice input is associated with a first speaker and the second voice input is associated with a second speaker or determining a speech-to-text conversion failure.

18. The method of claim 15, wherein deactivating the one or more teleconference features comprises turning off the one or more teleconference features that were previously activated.

19. The method of claim 15, further comprising determining first timing data associated with the first voice input and second timing data associated with the second voice input.

20. The method of claim 15, further comprising:
determining, based on the first voice input, the speech collision comprises an interruption event;
determining the interruption event comprises a pause event; and
activating, based on the pause event, the one or more teleconference features.

21. The method of claim 15, further comprising:
converting the first voice input and the second voice input to text; and
determining, based on the text conversion, an interruption event.

* * * * *